US008577806B2

(12) United States Patent
Kuehr-McLaren et al.

(10) Patent No.: US 8,577,806 B2
(45) Date of Patent: Nov. 5, 2013

(54) METHOD, SYSTEM, AND COMPUTER PROGRAM PRODUCT FOR DIGITAL VERIFICATION OF COLLECTED PRIVACY POLICIES IN ELECTRONIC TRANSACTIONS

(75) Inventors: David G. Kuehr-McLaren, Apex, NC (US); Martin Presler-Marshall, Chapel Hill, NC (US); Calvin S. Powers, Chapel Hill, NC (US); Timothy Shoriak, Cary, NC (US); John H. Walczyk, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2516 days.

(21) Appl. No.: 10/706,334

(22) Filed: Nov. 12, 2003

(65) Prior Publication Data

US 2005/0102155 A1 May 12, 2005

(51) Int. Cl.
*G06F 21/00* (2013.01)
*G06Q 30/00* (2012.01)

(52) U.S. Cl.
USPC .......................................... 705/50; 705/26.1

(58) Field of Classification Search
USPC .................... 709/228; 705/10, 80, 26; 726/24
See application file for complete search history.

(56) References Cited

U.S. PATENT DOCUMENTS

| | | | | |
|---|---|---|---|---|
| 5,745,574 | A | | 4/1998 | Muftic ............................. 380/23 |
| 5,987,440 | A | | 11/1999 | O'Neil et al. ................... 705/44 |
| 6,606,744 | B1 | * | 8/2003 | Mikurak ........................ 717/174 |
| 6,697,824 | B1 | * | 2/2004 | Bowman-Amuah .......... 709/229 |
| 6,907,401 | B1 | * | 6/2005 | Vittal et al. ..................... 705/26 |
| 7,171,691 | B2 | * | 1/2007 | Baber et al. ..................... 726/24 |
| 7,185,204 | B2 | * | 2/2007 | Narayanaswami et al. ... 713/182 |
| 7,225,460 | B2 | * | 5/2007 | Barzilai et al. ..................... 726/1 |
| 2002/0026345 | A1 | * | 2/2002 | Juels ............................... 705/10 |
| 2002/0029201 | A1 | * | 3/2002 | Barzilai et al. ................. 705/80 |
| 2002/0104015 | A1 | * | 8/2002 | Barzilai et al. ................ 713/201 |

(Continued)

FOREIGN PATENT DOCUMENTS

| | | |
|---|---|---|
| JP | 2000-11075 A | 1/2000 |
| JP | 2001-265217 A | 9/2001 |

(Continued)

OTHER PUBLICATIONS http://www.cdt.org/publications/pp_8.25.shtml—"New Law to Require Privacy Impact Assessments for U.S. Agencies", "Privacy Notices, Including P3P Statements, Now Required for Agencies".*

(Continued)

*Primary Examiner* — Evens J Augustin
(74) *Attorney, Agent, or Firm* — Jeffrey T. Holman

(57) ABSTRACT

Parties involved in transacting business in an E-marketplace (E-marketplace participants) each identify and submit to the E-marketplace their P3P policy and/or other relevant characteristics related to their privacy policy needs (those that they adhere to, referred to as "privacy policies"; those that they require, referred to as "privacy preferences", or both). Submitted with the privacy policy is a digital signature that is tied to the owner of the web objects to which the privacy policy pertains. Using a digital signature assures the integrity of the privacy policy since it travels with the privacy policy and thus refers back to the original sender of the policy rather than the middleman (the E-marketplace), and if the document (the privacy policy) to which it is attached has been tampered with, the digital signature will be invalidated.

20 Claims, 3 Drawing Sheets

(56) References Cited

U.S. PATENT DOCUMENTS

2003/0004898 A1* 1/2003 McAuliffe et al. .............. 705/80
2004/0054598 A1* 3/2004 Kall et al. ..................... 705/26
2006/0075122 A1* 4/2006 Lindskog et al. ............. 709/228

FOREIGN PATENT DOCUMENTS

| JP | 2003-091649 | | 3/2003 |
|----|---|---|---|
| JP | 2003-198539 | A | 7/2003 |
| WO | 0221789 | A2 | 3/2002 |

OTHER PUBLICATIONS http://web.archive.org/web/20020612084749/www.p3ptoolbox.org/guide/section2.shtml, "What is P3P and How Does it Work?".*

Hamuro, D., et al., A study on Personal Information Exchange by Policy Based Control, Apr. 18, 2003, pp. 25-29.

Honjo, S., et al., Private Attributes Based Authentication and Authorization System on WWW, IPSJ Journal vol. 43 No. 8, Aug. 15, 2002, pp. 2573-2586.

Kanzaki, Major XML/XHTML related Recommended Standards—Trusted Information: Encryption and Signature, www.kanzaki.com/book/html, Oct. 10, 2003, pp. 1-8.

Fujitsu Corporation, XML related technology for improve reliability of P3P privacy policy—Prevent leakiness of private information by managing Privacy by himself/herself—P3P Deployment Guide, W3W, Jun. 25, 2003 pp. 1-4.

Komatsubara et al. "The Approaching of Practical Utilization of P3P Which Exactly Collects Personal Information." Nikkei Internet Technology, Nikkei BP Publishing Co., LTD., (Dec. 1999), vol. 30, pp. 124-139.

* cited by examiner

METHOD, SYSTEM, AND COMPUTER PROGRAM PRODUCT FOR DIGITAL VERIFICATION OF COLLECTED PRIVACY POLICIES IN ELECTRONIC TRANSACTIONS

BACKGROUND OF THE INVENTION

1. Field of the Invention

The present invention relates to the use of privacy policies in computer-based on-line commerce in which sellers and buyers of goods or services are linked via an electronic marketplace where deals are negotiated and consummated.

2. Description of the Related Art

As networks of linked computers become an increasingly more prevalent concept in everyday life, on-line interactions between buyers and sellers have become commonplace. Transactions between a business and an individual consumer are referred to as business-to-consumer (B2C) transactions and transactions between businesses (e.g., the sale of goods from a manufacturer to a wholesaler who uses the purchased goods to eventually sell a product on the retail level) are referred to as business-to-business (B2B) transactions.

As a result of this increased use of networked computers to transact business, the concept of the electronic marketplace, referred to herein as the "E-marketplace," has emerged and become a standard form of conducting these business transactions. For a variety of reasons, the intermediary function provided by the E-marketplace is now an everyday part of transactional commerce.

On the consumer end, E-commerce sites such as E-Bay, half.com, Ubid.com, and AuctionPort.com provide an E-marketplace serving as a central location for negotiation of sales and/or auctions of products or services from a seller to a consumer (e.g., bidders). Likewise, B2B sellers provide a similar intermediary service for business transactions between businesses.

A significant trade off for enjoying the convenience of e-commerce is the need to submit to a semi-public forum what would typically be considered private information. For example, to do business on an e-commerce site, it is usually necessary to provide any or all of the following: name, address, telephone number, email address, credit card numbers, demographic information and the like. For B2B, this information might include banking information, pricing information, inventory information, and personal information pertaining to company contacts. This quite naturally concerns users of e-commerce since once submitted to the e-commerce site, the user loses control of the use of the information by others. This invariably stops some users from utilizing e-commerce sites to make purchases, despite the convenience that they offer.

As a result of the above problems, steps have been taken to develop methods for protecting the privacy of e-commerce users while allowing the e-commerce sites to function. As an example, the Platform for Privacy Preferences Project (P3P) was developed by the World Wide Web Consortium and has emerged as an industry standard providing a simple, automated way for users to gain more control over the use of personal information on websites that they visit. P3P is a standardized set of multiple-choice questions, covering all the major aspects of a website's privacy policies. Taken together, they present a clear snapshot of how a site claims to handle personal information about its users. P3P-enabled websites make this information available in a standard, machine-readable format. P3P-enabled browsers can "read" this snapshot automatically and compare it to the consumer's own set of privacy preferences. P3P enhances a user's control by putting privacy policies where users can find them, in a form users can understand, and most importantly, enables users to act on what they see.

While functioning adequately, use of P3P or other systems to specify privacy information in an E-marketplace can be quite cumbersome. A declaration of a privacy policy that characterizes an entire particular marketplace is difficult to identify and to express. An E-marketplace administrator can require all participants to adhere to one particular privacy policy, either overall or even on a section-by-section basis of the marketplace (e.g., all electronics vendors adhere to one privacy policy, all service providers adhere to another privacy policy, etc.), but requiring this adherence will limit the number of willing seller participants. Similarly, the marketplace portal could invoke a privacy statement that only applies to the portal itself, but not to the individual participants available via the portal. This would likely limit the number of potential buyers using the portal, since there would be no guarantee that the portal participants would respect the buyers' privacy needs. The use of this information will depend on the individual privacy policy of the parties involved in the transaction, and at each juncture in the transaction, the consumer's set of privacy preferences will have to be compared with those of each party to the transaction, an annoying and time-consuming process.

The P3P working group proposed a recommendation that an SSL (secure sockets layer) be utilized to ensure the integrity of a P3P policy being transmitted from one party to another. The effect of using an SSL is that the owner of the SSL certificate used to secure the TCP/IP connection essentially vouches for the integrity of the policy. This works acceptably for connections between two parties. However, in portal and multi-hosting environments such as an E-marketplace, where the E-marketplace acts in a middle-man capacity, the integrity can only be vouched for as between a participant and the middle-man (the E-marketplace). Thus, an unscrupulous E-marketplace administration could receive the P3P policy over the SSL, modify it, and send it along to others. Likewise, an unscrupulous vendor could deny the terms of the policy as being valid (after having presented the terms to the E-marketplace in the hope of drumming up business), since the policy cannot be directly tied to the vendor.

SUMMARY OF THE INVENTION

In accordance with the present invention, parties involved in transacting business in an E-marketplace (E-marketplace participants) each identify and submit to the E-marketplace their P3P policy and/or other relevant characteristics related to their privacy policy needs (those that they adhere to, referred to as "privacy policies"; those that they require, referred to as "privacy preferences", or both). Submitted with the privacy policy is a digital signature that can be tied to the owner of the web objects to which the privacy policy pertains. Using a digital signature assures the integrity of the privacy policy since it travels with the privacy policy and thus refers back to the original sender of the policy rather than the middleman (the E-marketplace). Further, this method removes the onus on the SSL certificate owner to vouch for the privacy policy of the web objects hosted in a portal.

In an alternative embodiment, a P3P privacy policy and/or privacy policy characteristics submitted to the portal can also be digitally signed by a trusted third party/certification agent who vouches for the privacy policy implementation. Allowing the certification group to sign the certified company's privacy policy eliminates the manual step of looking up the company at the certification group's website.

DETAILED DESCRIPTION OF THE PREFERRED EMBODIMENTS

Figure 1:
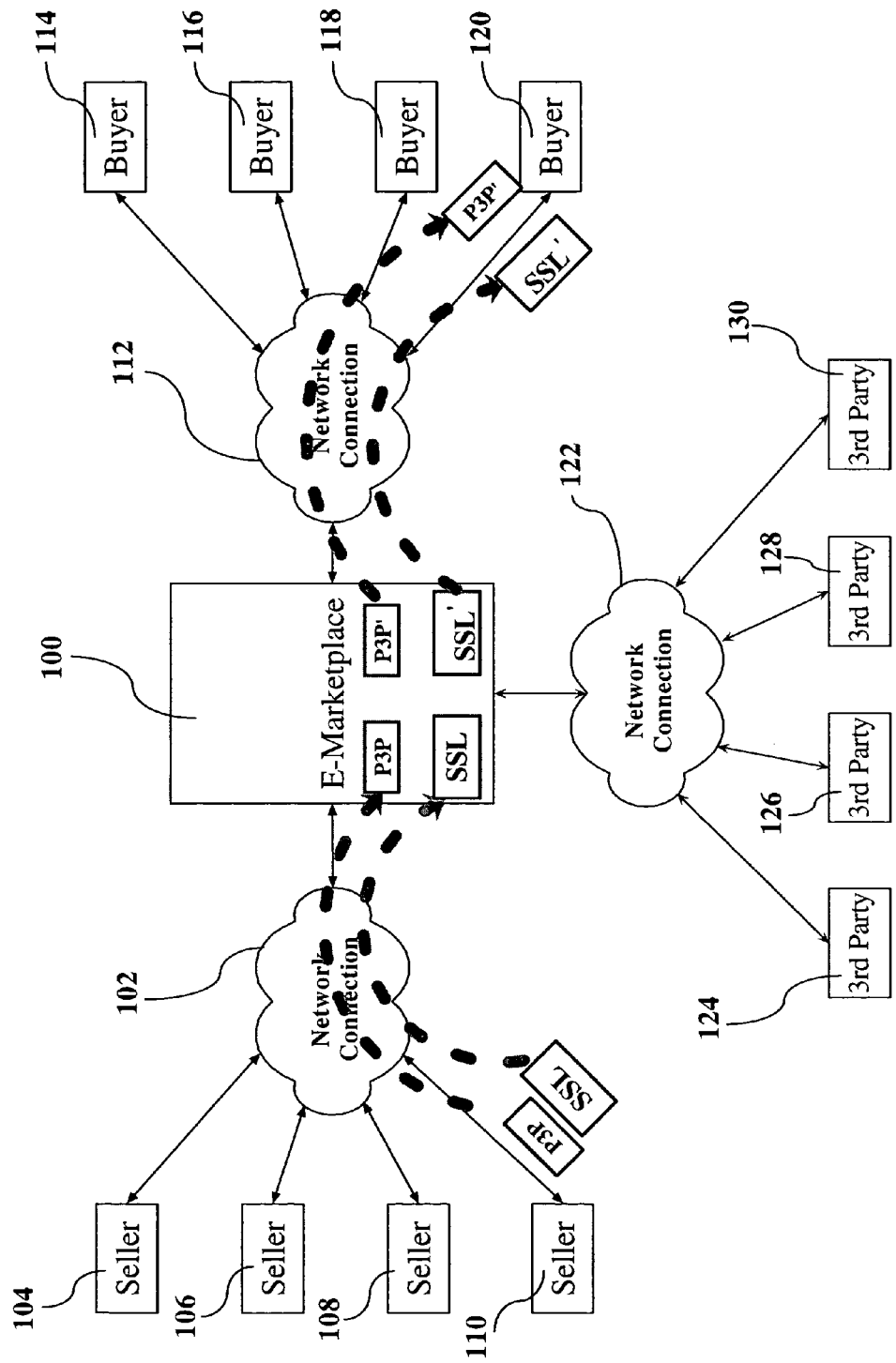
FIG. 1 illustrates a typical E-marketplace environment and prior art methods of transmitting privacy information.

FIG. 1 illustrates a typical E-marketplace environment in which the present invention can be practiced and also shows the potential for misuse of privacy policies, absent the present invention. An E-marketplace 100 is coupled to a plurality of sellers 104, 106, 108 and 110 via a network connection 102 (e.g., the Internet). Similarly, E-marketplace 100 is connected to a plurality of buyers 114, 116, 118, and 120 via a network connection 112. In a B2B marketplace, both buyers and sellers are businesses and typically, most participants act in both capacities at one time or another. Typically, the E-marketplace 100 will comprise a server configured to receive communications from the network connections 102, 112, store information for viewing by parties connected to the network connections 102 and 112, and store other information pertaining to transactions which may occur in the E-marketplace. Sellers 104, 106, 108, and 110, and buyers 114, 116, 118, and 120, typically use PC workstations, PDA's, networks, wireless devices, or other network communication devices for accessing the E-marketplace via the network connections 102 and 112.

In a typical electronic transaction using the environment illustrated in FIG. 1, a seller, e.g., seller 104, will connect to E-marketplace 100 via the network connection 102 and register with the E-marketplace. Seller 104 may identify itself by a pseudonym and typically will be required to also provide true name, address, e-mail address and other identity information for identification purposes.

As described above, a seller, e.g., seller 110, transmits its P3P policy (or other policy information) to the E-marketplace via network 102, as shown. The transmission of a P3P policy by itself in this manner is referred to herein as a transmission of a "naked" P3P. A problem exists, however, because the E-marketplace can modify the naked P3P policy so that it differs from the policy presented by the seller 110, resulting in P3P policy 150'. The marketplace can then present the modified P3P policy 150' to a buyer, e.g., buyer 120, thereby creating the impression that the P3P policy 150', is that of seller 110. Another problem is that the seller can deny the accuracy of the P3P policy, claiming that it was altered by the E-marketplace, the buyer, or a third party (e.g., a hacker).

Also as described above, an SSL certificate 152 can be sent from seller 110 to the E-marketplace 100 via the network connection 102, along with the P3P policy 150. This will confirm to the E-marketplace (and to the client browser of seller 110) that the E-marketplace is "talking" to the client browser of seller 110 and that the data sent by seller 110 was not tampered with in transit. However, the E-marketplace may be communicating with buyer 120 over a different SSL connection and thus present its own SSL certificate, SSL', to buyer 120 when transmitting the modified P3P policy 150'. Thus, the prior art does not allow a participant communicating through a middle person (the E-marketplace) to confirm that a third party with which they are doing business is the originator of the P3P policy that purports to be theirs.

Figure 2:
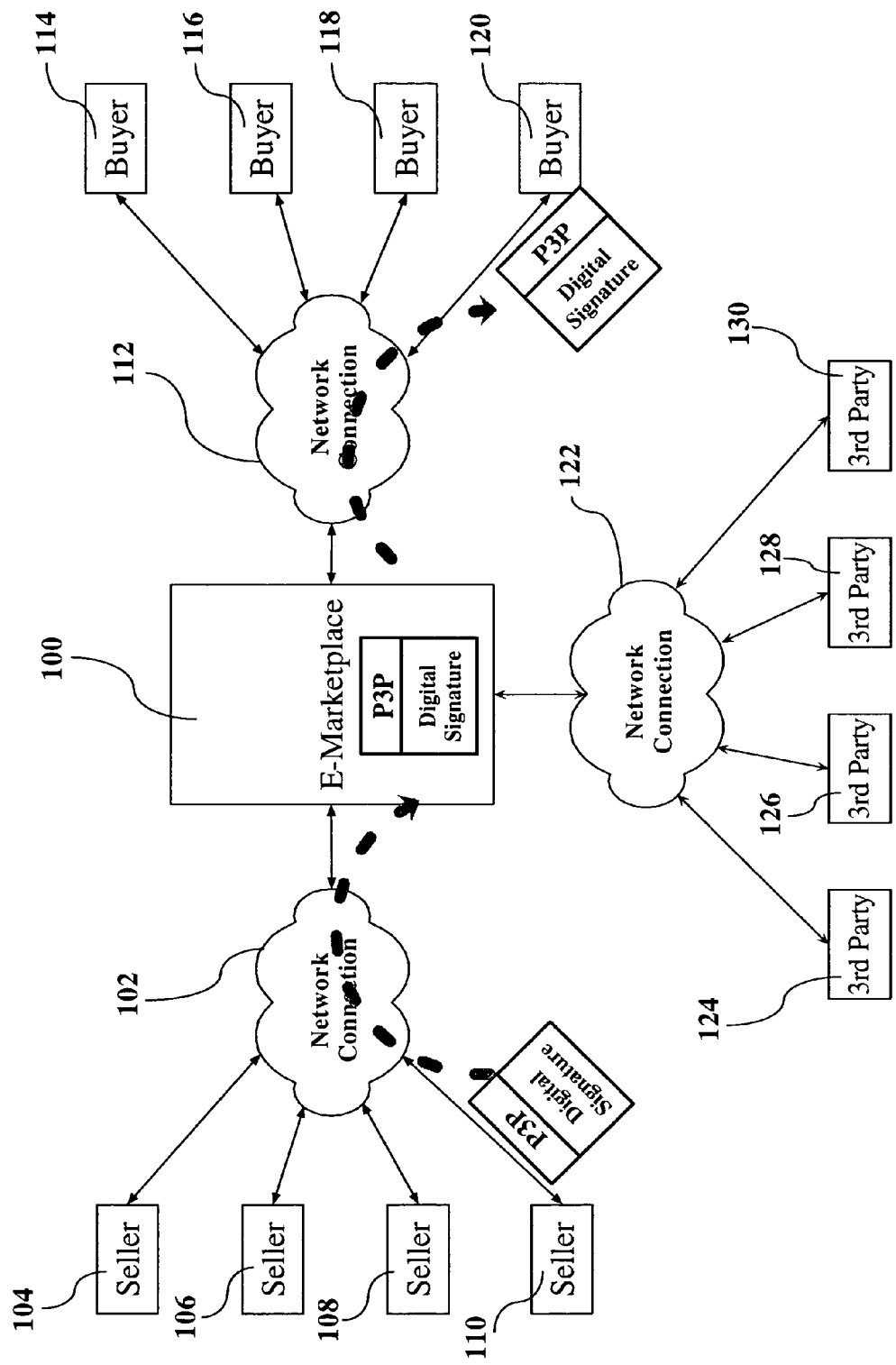
FIG. 2 illustrates a method of enabling verification of the validity of privacy information being shared in an E-marketplace, in accordance with the present invention.

FIG. 2 illustrates the present invention applied to the E-marketplace depicted in FIG. 1. In contrast to the naked P3P or P3P/SSL Certificate combination of FIG. 1, in FIG. 2, the P3P policy (or other policy information) is digitally signed, in this example by the submitter, Seller 110. Digitally signing documents is a well known process and the details regarding how the signing is accomplished are not relevant to the present invention. Any known method for digitally signing the P3P policy may be used. The digitally signed P3P policy is transmitted to the E-marketplace over the network, just as the P3P and/or P3P/SSL certificate combination are transmitted as described above with respect to FIG. 1. If the E-marketplace administrator (or a hacker or other unauthorized party) attempts to modify the P3P policy, the digital signature will be invalidated. Thus, when a subsequent buyer (or other person attempting to view the P3P policy) attempts to verify that the policy was presented to the E-marketplace by Seller 110, the invalidated signature will identify that there has been a problem with the P3P policy, and thus the party will be made aware of the problem. The digital signature will be intact, regardless of the number of SSL connections or traversed, as long as no one has modified the P3P policy.

Figure 3:
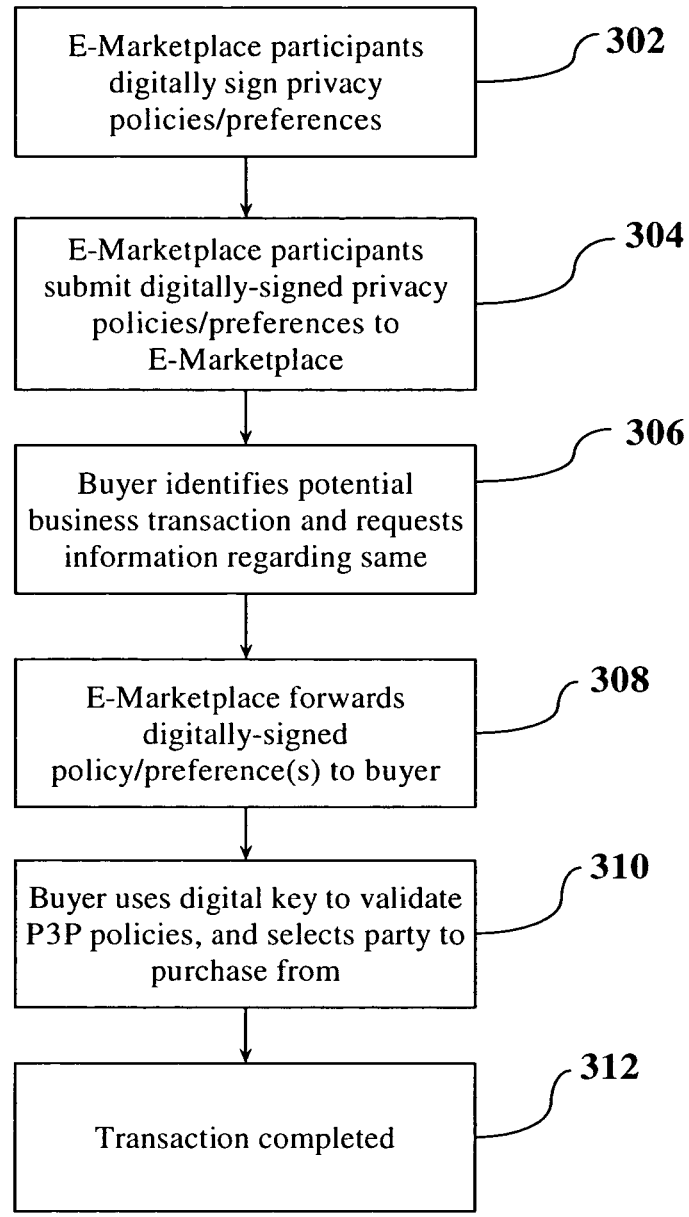
FIG. 3 is a flowchart illustrating an example of basic steps performed in accordance with the present invention.

FIG. 3 is a flowchart illustrating an example of the basic steps performed in accordance with the present invention. At step 302, an E-marketplace participant digitally signs its privacy policy (e.g., its P3P policy), and at step 304, the digitally signed privacy policy is submitted to the E-marketplace. As the middleman, the E-marketplace stores the digitally signed privacy policy for use at the appropriate time in subsequent transactions.

At step 306, a buyer identifies potential business partners who have made themselves available on the E-marketplace and who are offering goods or services of interest to the buyer. The buyer then requests information regarding the potential business partners and/or the goods/services that they provide.

In one embodiment of the present invention, the digitally-signed privacy information is sent to the buyer at this time, so that it is available for the buyer to verify. However, in a preferred embodiment, the digitally-signed privacy information is forwarded to the buyer in a separate step (step 308) after the buyer has selected a business partner to do business with, and if desired, not until after the contract of sale has been agreed to between the parties (pending verification of the privacy information).

At step 310, the buyer validates the integrity and ownership of the privacy policy using known techniques by using the digital privacy key associated with the business partner, and this allows the buyer to verify that the privacy policy has not been tampered with since being submitted by the business partner. If the buyer has not already agreed to partner with the business partner, at this point the buyer makes such an agreement, and at step 312 the transaction is completed in the same manner as any other E-marketplace transaction.

The method of the present invention can be performed in different sequences. In one embodiment, the marketplace verifies signed policies during the registration process and vouches for their accuracy. The marketplace can verify that the participant submitting the P3P policy has submitted a policy that has not been tampered with, by verifying the signature. This method requires that the participants trust the E-marketplace's vouching procedure.

In an alternative preferred embodiment, the buyer verifies the policy of the market participants at the time of the transaction. Thus, for example, when buyer 120 purchases product or services from seller 110, the marketplace simply forwards the privacy policy of seller 110, and the buyer verifies the seller's signature, thus verifying that the P3P policy is the same policy sent from seller 110 to the E-marketplace during the registration process. In addition, the buyer 120 can also verify the signatures of any third parties involved in the transaction, such as, insurance carriers, shippers and the like. Further, if there is a third party verification service that will agree to vouch for the seller, then a digitally signed statement from that third party vouching for the seller can also be confirmed as having been transmitted from the third party without tampering.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as in the permanent storage of a workstation or server maintained by the E-Marketplace. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A computer-implemented method of conducting electronic commerce transactions among a plurality of participants in an E-marketplace, comprising the steps of:
   the E-marketplace obtaining, via a computer, digitally-signed privacy-use information for each participant, wherein the digitally-signed privacy-use information is obtained separate from a business transaction between participants; and
   the E-marketplace sharing, via said computer, the digitally-signed privacy-use information with any participants interested in doing business with each other in the E-marketplace, wherein the sharing allows the participants to verify that the digitally-signed privacy-use information has not been tampered with since being submitted to the E-marketplace.

2. The method of claim 1, wherein said privacy information comprises a P3P policy.

3. The method of claim 1, wherein said step of obtaining digitally-signed privacy-use information for each participant comprises at least the steps of:
   requesting, via said computer, each participant to submit said digitally-signed privacy-use information to the E-marketplace as part of a registration procedure for the E-marketplace; and
   storing, via said computer, all of said submitted digitally-signed privacy-use information by the E-marketplace.

4. The method of claim 1, wherein said step of obtaining digitally-signed privacy-use information for each participant comprises at least the steps of:
   requiring each participant to submit, via said computer, said digitally-signed privacy-use information to the E-marketplace as part of a registration procedure for the E-marketplace; and
   storing, via said computer, all of said submitted digitally-signed privacy-use information by the E-marketplace.

5. The method of claim 4, wherein said step of sharing the digitally-signed privacy-use information comprises at least the step of:
   said E-marketplace making available, via said computer, all of said stored digitally-signed privacy-use information to all participants upon request.

6. The method of claim 4, wherein said step of sharing the digitally-signed privacy-use information comprises at least the step of:
   said E-marketplace making available to participants in a particular transaction, via said computer, the stored digitally-signed privacy-use information of all participants in said particular transaction.

7. A computer program product recorded on computer-readable medium for conducting electronic commerce transactions among a plurality of participants in an E-marketplace, comprising:
   computer-readable means for the E-marketplace obtaining digitally-signed privacy-use information for each participant, wherein the digitally-signed privacy-use information is obtained separate from a business transaction between participants; and
   computer-readable means for the E-marketplace sharing the digitally-signed privacy-use information with any participants interested in doing business with each other in the E-marketplace, wherein the sharing allows the participants to verify that the digitally-signed privacy-use information has not been tampered with since being submitted to the E-marketplace.

8. The program product of claim 7, wherein said privacy information comprises a P3P policy.

9. The program product of claim 7, wherein said computer-readable means for obtaining digitally-signed privacy-use information for each participant comprises at least:
   computer-readable means for requesting each participant to submit said digitally-signed privacy-use information to the E-marketplace as part of a registration procedure for the E-marketplace; and
   computer-readable means for storing all of said submitted digitally-signed privacy-use information by the E-marketplace.

10. The program product of claim 7, wherein said computer-readable means for obtaining digitally-signed privacy-use information for each participant comprises at least:
    computer-readable means for requiring each participant to submit said digitally-signed privacy-use information to the E-marketplace as part of a registration procedure for the E-marketplace; and
    computer-readable means for storing all of said submitted digitally-signed privacy-use information by the E-marketplace.

11. The program product of claim 10, wherein said computer-readable means for sharing the digitally-signed privacy-use information comprises at least:
    computer-readable means for making available by said E-marketplace all of said stored digitally-signed privacy-use information to all participants upon request.

12. The program product of claim 10, wherein said computer-readable means for sharing the digitally-signed privacy-use information comprises at least:
  computer-readable means for making available to participants in a particular transaction, by said E-marketplace, the stored digitally-signed privacy-use information of all participants in said particular transaction.

13. A computer system for conducting electronic commerce transactions among a plurality of participants in an E-marketplace, comprising logic for:
  obtaining digitally-signed privacy-use information for each participant, wherein the digitally-signed privacy-use information is obtained separate from a business transaction between participants; and
  sharing the digitally-signed privacy-use information with any participants interested in doing business with each other in the E-marketplace, wherein the sharing allows the participants to verify that the digitally-signed privacy-use information has not been tampered with since being submitted to the E-marketplace.

14. The computer system of claim 13, wherein said privacy information comprises a P3P policy.

15. The computer system of claim 13, wherein said logic for obtaining digitally-signed privacy-use information for each participant comprises at least logic for:
  requesting each participant to submit said digitally-signed privacy-use information to the E-marketplace as part of a registration procedure for the E-marketplace; and
  storing all of said submitted digitally-signed privacy-use information by the E-marketplace.

16. The computer system of claim 13, wherein said logic for obtaining digitally-signed privacy-use information for each participant comprises at least logic for:
  requiring each participant to submit said digitally-signed privacy-use information to the E-marketplace as part of a registration procedure for the E-marketplace; and
  storing all of said submitted digitally-signed privacy-use information by the E-marketplace.

17. The computer system of claim 16, wherein said logic for sharing the digitally-signed privacy-use information comprises at least logic for:
  making available by said E-marketplace all of said stored digitally-signed privacy-use information to all participants upon request.

18. The computer system of claim 16, wherein said logic for sharing the digitally-signed privacy-use information comprises at least logic for:
  making available to participants in a particular transaction, by said E-marketplace, the stored digitally-signed privacy-use information of all participants in said particular transaction.

19. The method of claim 1, wherein sharing the digitally-signed privacy-use information comprises the E-marketplace sending the digitally-signed privacy-use information of a potential business partner to a buyer in conjunction with the buyer requesting information regarding the potential business partner, prior to the buyer selecting to do business with the potential business partner.

20. The method of claim 1, wherein sharing the digitally-signed privacy-use information comprises the E-marketplace sending the digitally-signed privacy-use information of a business partner to a buyer after the buyer selects to do business with the business partner.

* * * * *